Patented Jan. 26, 1932

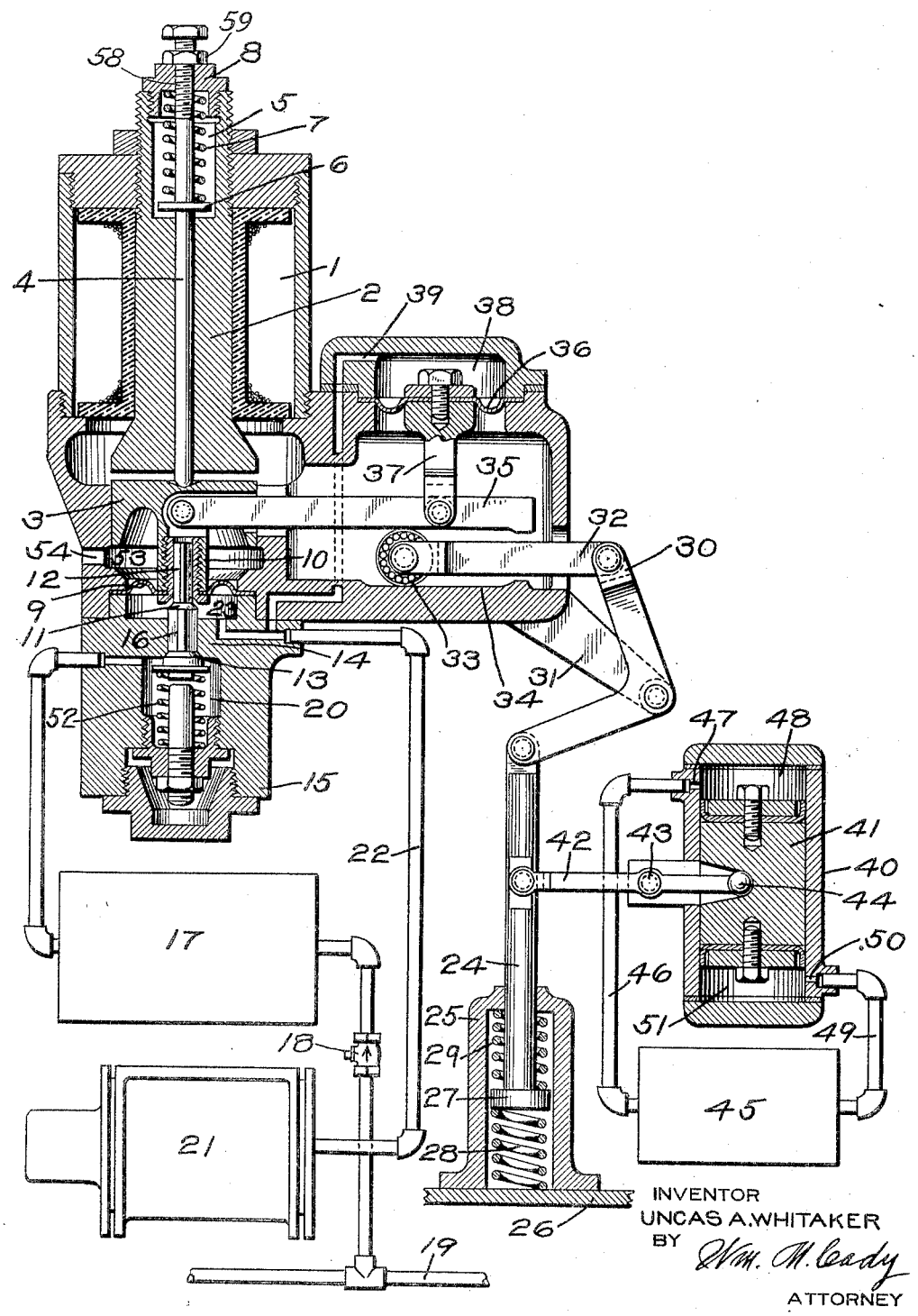

1,842,497

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

VARIABLE LOAD BRAKE

Application filed November 3, 1928. Serial No. 316,915.

This invention relates to fluid pressure brakes, and has for its principal object to provide a fluid pressure brake apparatus having novel means for regulating the braking power in proportion to the load on the vehicle.

Another object of my invention is to provide a fluid pressure brake apparatus comprising a valve operative to supply fluid under pressure to the brake cylinder to effect an application of the brakes, and also comprising means controlled according to the load on the vehicle and subject to brake cylinder pressure for assisting, under certain load conditions of the vehicle, in closing said valve, and under certain other load conditions, in opposing the closing of the valve.

A further object of my invention is to provide an electro-pneumatic variable load brake with means whereby the electric power required to operate the brake may be reduced to a minimum so that the voltage carried may not be dangerously high.

Other objects and advantages will appear in the following more detailed description of the invention.

In the accompanying drawing, the single figure is a diagrammatic sectional view of a combined electro-pneumatic and variable load brake apparatus embodying my invention.

The electro-pneumatic brake portion may comprises an electro-magnet 1 having a core 2, adjacent to the pole of which is mounted an armature 3. A rod 4 extends through a central bore in the core 2 and one end of the rod engages the armature 3. The opposite end of the rod extends into a chamber 5, provided in the upper end of the core 2, and within said chamber, the rod is provided with a collar 6, which is engaged by a coil spring 7. A cap member 8, screwed into the upper end of the core 2, provides an abutment for the spring 7.

Extending through, and having screw-threaded connection with the cap member 8, is a stop preferably in the form of a bolt 58, the inner end of which is adapted to be engaged by the outer end of the rod 4 to prevent unnecessary movement of the armature 3 and associated parts in a direction toward the pole piece 2. If it should be desired to increase or decrease the movement of the armature and associated parts in this direction, the bolt 58 is screwed upwardly or downwardly as the case may be, and when the desired adjustment has been made, the bolt is locked, in adjusted position, by a check nut 59.

Disposed adjacent to and in axial alinement with the armature 3 is a flexible diaphragm 9, and secured to said diaphragm is a stem 10 which is carried by the armature 3. A valve 11 seats on a valve seat provided at the lower end of the stem 10 and is provided with a stem 12 which extends into a central bore of the stem 10. In axial alinement with valve 11 is a valve 13 having a seat in a partition wall 14 of casing 15, and is provided with a stem 16 which extends through a bore in said wall and engages the valve 11.

A source of fluid under pressure, such as reservoir 17, which may be charged through a check valve 18 from the usual brake pipe 19, is connected to a valve chamber 20 which contains the valve 13. The brake cylinder 21 is connected through pipe 22 with the diaphragm chamber 23.

The variable load brake mechanism comprises a plunger 24, one end of which extends into a casing 25 which is carried by the spring plank of the car truck, as indicated by the reference numeral 26. The end of the plunger 24 is provided with a head 27 subject on one side to the pressure of a coil spring 28 and on the other side to the pressure of a coil spring 29.

A bell crank lever 30 is pivotally mounted on an arm 31 carried by the casing 15 and one arm of the bell crank lever is pivotally connected to the upper end of the plunger 24 while pivotally connected to the end of the other arm is a bar 32.

Mounted on the end of the bar 32 is a roller 33 which engages at one side a face 34 in the casing 15 and on the opposite side a fulcrum lever 35. Said fulcrum lever is pivotally connected at one end to the armature 3. A flexible diaphragm 36 is provided in the casing 15 and secured to said diaphragm is a stem 37, the outer end of which is pivotally connected to the lever 35, at any desired point intermediate the ends of said lever.

The chamber 38 at one side of the diaphragm 36 is connected to brake cylinder pipe 22 through a passage 39.

For maintaining the plunger 24 in its position of adjustment according to the load on the car against movement due to vibratory movement of the car body relative to the car truck, a cylinder 40 is provided which contains a double ended piston 41. A lever 42 fulcrumed on a pivot pin 43 is pivotally connected at one end to the plunger 24 and is provided at the other end with a rounded end portion 44 which engages in a socket provided in the piston 41.

A reservoir 45 containing a suitable liquid is connected through a pipe 46, and a restricted port 47 with the piston chamber 48 at one side of piston 41, and is connected through a pipe 49 and a restricted port 50 with the piston chamber 51 at the opposite side of the piston, and both of these piston chambers are filled with liquid. Since the reservoir 45 and both piston chambers are filled with liquid, movement of the piston 41 in either direction causes the liquid to be forced out of one of the piston chambers through one of the restricted ports to the reservoir 45 and from the reservoir through the other restricted port to the other piston chamber. The device therefore operates as a dash pot to resist movement of the lever 42, in either direction, by the movement of the plunger 24. The springs 28 and 29 prevent jolting and vibratory movements from being transmitted to the plunger 24, while the dash pot action of the piston 41 tends to maintain the plunger in its position of adjustment as effected by the load on the vehicle.

In operation, the spring 7 of the electro-pneumatic brake portion acts through the rod 4 against the armature 3 and tends to move the armature away from the magnet core 2. If the magnet 1 be sufficiently energized, the pressure of spring 7 will be overcome by the force of the magnetic pull of the magnet on the armature 3, so that said armature will be moved to a position permitting the valve 13 to be seated by the spring 52 and moving the stem 10 and diaphragm 9, so that the valve 11 is unseated. The brake cylinder 21 is then open to the exhaust through pipe 22, chamber 23, and past the open valve 11 to chamber 53, which is open to the atmosphere through port 54.

If it is desired to effect an application of the brakes, the current flow through the magnet 1 is reduced a certain amount, dependent on the degree of brake cylinder pressure desired. The magnetic pull of the magnet is thus reduced, permitting the spring 7 to exert its pressure through the rod 4 so as to move the armature 3 away from the magnet. By this movement the seat in the stem 10 is first brought into engagement with the valve 11 so as to cut off the exhaust from the brake cylinder, and then further movement causes the valve 13 to be unseated. Fluid under pressure is then supplied from reservoir 17 and valve chamber 20 to the brake cylinder.

When the brake cylinder pressure acting in chamber 23 has been increased to a sufficient degree, the diaphragm 9 will be deflected upwardly against the pressure of spring 7 until the valve 13 is permitted to seat, but not sufficiently to permit the valve seat carried by the diaphragm from being moved away from the valve 11.

The above operation, however, is modified by the action of the variable load mechanism in the following manner:

The plunger 24 being supported by the car truck and the casing 15 being carried by the car body, when the car body is depressed by a load, the movement of the car body relatively to the car truck causes a clockwise movement of the bell crank lever 30 and a corresponding movement of the bar 32 toward the right. When the load on the car is decreased, a counter-clockwise movement of the bell crank lever is caused and a corresponding movement of the bar 32 toward the left is effected. The fulcrum roller 33 is thus positioned at one side or the other of the stem 37 according to the load on the car.

Assuming the car to be empty, the fulcrum roller 33 will be in a position to the left of the stem 37 as shown in the drawing, and when the brakes are applied, fluid at brake cylinder pressure is supplied through passage 39 to diaphragm chamber 38 and acts through the diaphragm 36 and the stem 37 on the lever 35. The pressure exerted on the lever, at the right hand side of the fulcrum roller 33, acts on the armature 3 and tends to move the same upwardly against the resistance of the spring 7, in the same way that brake cylinder pressure in diaphragm chamber 23 acts on diaphragm 9.

Assuming the car to be heavily loaded, the fulcrum roller 33 will be in a position to the right hand side of the stem 37, and when the brakes are applied, fluid at brake cylinder pressure is supplied through passage 39 to diaphragm chamber 38 and acts through the diaphragm 36 and stem 37 on the lever 35. The pressure now exerted on the lever, at the left hand side of the fulcrum roller 33, acts on the armature 3 and tends to move the same downwardly against the pressure of fluid in the diaphragm chamber 23 acting on the diaphragm 9 in the same manner as the pressure of the spring 7 acts to resist the pressure of fluid in the chamber 23.

It will here be noted that when the fulcrum roller 33 is in a position to the left of the stem 37, the brake cylinder pressure in chamber 38, acting through the diaphragm 36 and stem 37, on the lever 35, assists the brake cylinder pressure in chamber 23, acting on the diaphragm 9, to overcome the resistance of the spring 7, and when the fulcrum roller 33 is in a position to the right of the stem 37, the pressure exerted upon the lever 35, through the medium of the stem 37, will assist the spring 7 in resisting the pressure of fluid in chamber 23, acting on the diaphragm 9.

For a given reduction in current flow through the magnet 1 in effecting an application of the brakes, the brake cylinder pressure obtained will be less as the load is decreased since the fulcrum roller 33 moves toward the left and thus increases the effective length of the arm of the lever 35 at the right hand side of the roller so that the effect of the brake cylinder pressure on diaphragm 36, as transmitted to the armature 3, is increased and the armature 3 is moved upwardly to close the supply valve 13 when the brake cylinder pressure has been increased to a degree less than would be the case were the variable load mechanism not effective. In a similar manner, as the load on the car is increased, the fulcrum roller 33 is moved toward the right and the effect of the brake cylinder pressure on the diaphragm 36 as transmitted through the lever 35 is correspondingly reduced, so that a higher brake cylinder pressure is obtained for a given reduction in current flow through the magnet 1.

When the load on the car has been increased to such a degree that the fulcrum roller is on the right hand side of the stem 37, the effect of the brake cylinder pressure on the diaphragm 36, as transmitted through the lever 35, instead of assisting in moving the armature upwardly against the pressure of the spring 7, assists the spring in resisting brake cylinder pressure in chamber 23 acting on the diaphragm 9, so that a still higher brake cylinder pressure is obtained when the car is heavily loaded for a given reduction in current flow through the magnet 1.

In an application for United States Letters Patent filed in my name on October 21, 1927, for Variable load brake and serially numbered 227,631, a variable load brake has been shown and described in which, the fulcrum roller is on the left hand side of the stem 37 in empty and load positions, so that the brake cylinder pressure in the chamber 38 acting through the diaphragm 36, stem 37 and lever 35 assists the brake cylinder pressure in the chamber 23 in overcoming the pressure of the spring 7 acting downwardly on the armature 3. The variable load brake shown and described in the present application differs from that of the above mentioned filed application, in that, the brake cylinder pressure in chamber 38, acting through the diaphragm 36, stem 37 and lever 35, when the car is empty or partly loaded, assist the brake cylinder pressure in chamber 23, acting through the diaphragm 9, armature 3 and stem 4, in overcoming the pressure of the spring 7 when an application of the brakes is being effected, and when the car is heavily loaded, the brake cylinder pressure in chamber 38, acting through the diaphragm 36, stem 37 and lever 35, assists the pressure of the spring 7 in opposing brake cylinder pressure in the chamber 23.

Since in effecting an application of the brakes the pressure of the spring 7 is not relied upon to wholly oppose, at all times, the brake cylinder pressure in chamber 23, said spring may be of considerably less capacity than that of the corresponding spring in my aforementioned application. Due to this reduction in the capacity of the spring 7, less power is required to cause the magnet 1 to overcome the pressure of said spring in releasing the brakes, and as a consequence the voltage carried is greatly reduced.

From the foregoing description it will be noted that, as the fulcrum roller 33 is made to assume different positions along the lever 35, the power applied to the lever through the medium of the diaphragm 36 and stem 37 and transmitted to the armature 3, will be so modified as to create the proper pressure differential on the diaphragm 9 for the operation of the brake in accordance with the load on the car. By thus creating a pressure differential, the diaphragm 9 may be reduced in size to a minimum consistent with strength and practicability of manufacture.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake apparatus for controlling the brakes on a vehicle, of means on the vehicle for varying the braking power in accordance with the load on the vehicle, said means comprising a lever operative to control the braking power, means for applying power to said lever to operate it, and a fulcrum for said lever movable in accordance with the load on the vehicle to one side or the other of the point of power application to said lever to govern the operation of said lever in accordance with the load on the vehicle.

2. The combination with a brake apparatus for controlling the brakes on a vehicle, of means on the vehicle for varying the braking power in accordance with the load on the vehicle, said means comprising a lever operative to control the braking power, fluid pressure operated means for applying power to said lever to operate it, and a fulcrum for said lever movable in accordance with the load on the vehicle to one side or the other of the point where power is applied to said lever to govern the operation of said lever in accordance with the load on the vehicle.

3. The combination with a brake apparatus for controlling the brakes on a vehicle, of means on the vehicle for varying the braking power in accordance with the load on the vehicle, said means comprising a lever operative to control the braking power, fluid pressure operated means secured to said lever intermediate the ends of the lever for operating the lever, and a fulcrum for said lever movable in accordance with the load on the vehicle to one side or the other of the connection of said fluid pressure operated means and lever for controlling the operation of the lever in accordance with the load on the vehicle.

4. The combination with a brake cylinder and an electro-pneumatic brake apparatus for controlling the supply of fluid under pressure to the brake cylinder, of means for varying the pressure of fluid supplied to the brake cylinder by said electro-pneumatic brake apparatus in accordance with the load on the car, said means comprising a fulcrum lever, means for applying power to said lever, and means for adjusting the fulcrum point of said lever to positions at one side or the other of the power applying means according to the load on the car.

5. The combination with a brake cylinder and electro-responsive means operated upon a reduction in current flow for supplying fluid under pressure to the brake cylinder of means responsive to variations in the load on the car for varying the pressure of fluid supplied to the brake cylinder by said electro-responsive means, said electro-responsive means comprising a lever, means for applying power to said lever at a predetermined point, and a fulcrum for said lever movable, according to the variations in the load on the car, to positions at one side or the other of said point of power application.

6. In a fluid pressure brake, the combination with a brake cylinder, a valve operative for supplying fluid under pressure to the brake cylinder, a movable abutment operated by brake cylinder pressure for closing said valve, and means operative according to the load on the car for either assisting or opposing the closing of said valve.

7. In a fluid pressure brake, the combination with a brake cylinder, a valve operative for supplying fluid under pressure to the brake cylinder, a movable abutment operated by brake cylinder pressure for closing said valve, and means operative according to the load on the car and subject to brake cylinder pressure for either assisting or opposing the closing of said valve.

8. In a fluid pressure brake, the combination with a brake cylinder, a valve operative for supplying fluid under pressure to the brake cylinder, a movable abutment operated by brake cylinder pressure for closing said valve, a lever operatively connected with said abutment, a second movable abutment subject to brake cylinder pressure for applying power to said lever, and a fulcrum for said lever movable according to the load on the car for controlling the application of power transmitted by said lever to either assist or oppose the closing of said valve by the first mentioned movable abutment.

9. In a fluid pressure brake, the combination with a brake cylinder, a valve operative for supplying fluid under pressure to the brake cylinder, a movable abutment operated by brake cylinder pressure for closing said valve, a lever operatively connected with said abutment, means for applying power to said lever, and a fulcrum for said lever movable according to the load on the car for causing the power transmitted through said lever to either assist or oppose the closing of said valve.

10. In a fluid pressure brake, the combination with a brake cylinder, a valve operative for supplying fluid under pressure to the brake cylinder, a movable abutment operated by brake cylinder pressure for closing said valve, a lever operatively connected with said abutment, a second movable abutment subject to brake cylinder pressure for applying power to said lever, and means subject to the load on the car for directing the power transmitted through said lever either upwardly to assist in closing said valve or downwardly to oppose the closing of said valve.

11. In a fluid pressure brake, the combination with a brake cylinder, a valve operative for supplying fluid under pressure to the brake cylinder, a movable abutment operated by brake cylinder pressure for closing said valve, a lever operatively connected with said abutment, a second movable abutment secured to said lever intermediate its ends and subject to brake cylinder pressure for applying power to the lever, and a fulcrum for said lever movable according to the load on the car to positions to cause the power transmitted by said lever to be applied to oppose the closing of said valve and to positions to assist in the closing of said valve.

12. The combination with a brake cylinder, of an electro-magnet, an armature controlled by said magnet, valve means operative by said armature for supplying fluid under pressure to the brake cylinder, a movable abutment connected with said armature and subject to brake cylinder pressure for closing said valve, a lever operatively connected to said armature, a second movable abutment subject to brake cylinder pressure for applying power to said lever to operate it, and a fulcrum for said lever movable according to the load on the car for causing the power transmitted through said lever to be applied to said armature to either assist or oppose the closing of said valve.

13. The combination with a brake cylinder, of an electro-magnet, an armature controlled by said magnet, valve means operative by said armature for supplying fluid under pressure to the brake cylinder, a movable abutment connected with said armature and subject to brake cylinder pressure for closing said valve, a lever operatively connected to said armature, a second movable abutment operatively connected to said lever at a point intermediate the ends of the lever and subject to brake cylinder pressure for operating said lever, a fulcrum for said lever movable according to the load on the car to one side or the other of the point of connection of the second movable abutment and the lever to control the operation of said lever, and means for adjusting said fulcrum.

14. The combination with a brake cylinder and electro-responsive means operated upon a reduction in current flow for supplying fluid under pressure to the brake cylinder, of a movable abutment subject to brake cylinder pressure for closing off the supply of fluid under pressure to the brake cylinder and mechanism operative according to the load on the car for either opposing or assisting the closing operation of said abutment.

In testimony whereof I have hereunto set my hand, this 30th day of October, 1928.

UNCAS A. WHITAKER.